United States Patent
Hellwig et al.

(10) Patent No.: US 11,940,154 B2
(45) Date of Patent: Mar. 26, 2024

(54) WALL OVEN DOOR GASKET CLIP

(71) Applicant: Haier US Appliance Solutions, Inc., Wilmington, DE (US)

(72) Inventors: Frank Jacob Hellwig, East Ridge, TN (US); Mahesh Racha, Hyderabad (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 438 days.

(21) Appl. No.: 17/323,021

(22) Filed: May 18, 2021

(65) Prior Publication Data

US 2022/0373188 A1 Nov. 24, 2022

(51) Int. Cl.
*F24C 15/02* (2006.01)
*F16B 2/20* (2006.01)

(52) U.S. Cl.
CPC .............. *F24C 15/021* (2013.01); *F16B 2/20* (2013.01)

(58) Field of Classification Search
CPC ........... F16B 2/20; F16B 2/248; F24C 15/021
See application file for complete search history.

(56) References Cited

U.S. PATENT DOCUMENTS

| | | | |
|---|---|---|---|
| 5,806,149 A * | 9/1998 | Schultz | F16B 2/248 49/492.1 |
| 7,464,461 B2 | 12/2008 | Sylvia | |
| 7,735,836 B2 | 6/2010 | Bono, Jr. | |
| 8,214,974 B2 | 7/2012 | Yousong | |
| 9,447,628 B2 | 9/2016 | Flasher | |
| 10,088,095 B2 * | 10/2018 | Guan | G09F 7/18 |
| 10,240,798 B2 | 3/2019 | Mi | |
| 2019/0249699 A1 * | 8/2019 | Mao | F16B 2/248 |

FOREIGN PATENT DOCUMENTS

CN 203575481 U 5/2014

\* cited by examiner

*Primary Examiner* — Alfred Basichas
(74) *Attorney, Agent, or Firm* — Dority & Manning, P.A.

(57) ABSTRACT

An oven appliance includes a cabinet defining a cooking chamber to receive items to be cooked. The oven appliance includes a door that rotates between an open and closed position. A braided gasket is interposed between the door and the perimeter of the outer walls of the cooking chamber when the door is in the closed position. The braided gasket is attached to the perimeter by one or more gasket clips. The gasket clips have a head, a body positioned perpendicular to the head, and a leg extending from the end of the body and overlapping at least a portion of the body, at least a portion of the leg extending parallel to the body. A tail extends from an end of the head, at least a portion of the tail extending parallel to the body.

20 Claims, 4 Drawing Sheets

WALL OVEN DOOR GASKET CLIP

FIELD OF THE INVENTION

The present subject matter relates generally to oven appliances, and more particularly to gasket clip for attaching a gasket in an oven appliance.

BACKGROUND OF THE INVENTION

Conventional residential and commercial oven appliances generally include a cabinet that defines a cooking chamber for receipt of food items for cooking. A door is attached to the cabinet, rotating between an open and closed position. When the door is in the closed position, a braided gasket is interposed between the door and the cabinet to seal and insulate the cooking chamber. The braided gasket is typically attached to the cabinet using gasket clips.

Some conventional gasket clips have a body that resides within the braided gasket and a head that extends out of the braided gasket for insertion into openings, wherein the design of head enables the head to collapse during insertion and expand after insertion, locking the gasket clip head within the opening. Often, conventional gasket clips comprise a single strand of wire bent having first and second ends bent to the desired shape. The portion of the wire forming the head generally has one end of the wire which terminates immediately after forming the head. This end is sharp and fails to provide stability to the head, allowing the head to open up and become dislodged at its point of connection or to tear the braided gasket it is meant to secure upon installation, transport, or other use of the oven appliance.

Further, many conventional gasket clips have a body perpendicular to the head comprising a wire wrapped in a generally oval shape, much like a paper clip. The body of these gasket clips extends around the oval-like loop and terminates at a second end beside another portion of the gasket clip. In this conventional arrangement, forces exerted on the gasket clip during installation, transport, or use of the oven appliance may cause the body of the gasket clip to pull free from the braided gasket, possibly damaging the gasket and allowing the gasket to move from a desired position.

Moreover, in conventional gasket clips, the terminal end extending from the body of the gasket clip may be sharp. Installation of the gasket clip is performed by pressing, for example with one's thumb, against the side of the body of the gasket clip opposite from the head. The sharp end of the body can cause injury or discomfort for installers.

Accordingly, oven appliances having improved gasket clips would be desirable. Specifically, oven appliances having gasket clips that are designed to minimize the risk of gasket tearing, that prevent gasket clips from being pulled out of the gasket or point of connection under reasonable forces, and having a more ergonomic design for installation would be desirable.

BRIEF DESCRIPTION OF THE INVENTION

Aspects and advantages of the invention will be set forth in part in the following description, or may be obvious from the description, or may be learned through practice of the invention.

In one aspect of the present disclosure, an oven appliance is provided. The oven appliance includes a cabinet to receive items to be cooked, a door pivotably attached to the cabinet, a braided gasket, and a gasket clip for attaching the braided gasket to the oven appliance. The cooking chamber includes a top wall, a bottom wall, a rear wall, and opposing sidewalls, the top wall, bottom wall, and sidewalls collectively forming a perimeter defining a front opening to the cooking chamber. The door pivots between an open position and a closed position, covering the front opening of the cooking chamber when the door is in the closed position. The braided gasket is positioned between the oven door and the front face of the perimeter when the oven door is in the closed position. The gasket clip includes a head for attaching the braided gasket to the oven appliance, the body at least partially contained within the braided gasket, and a leg extending from an end of the main body. The body of the gasket clip is substantially perpendicular to the head and includes a main body portion and a transition portion connecting the head to the main body. The leg overlaps with the transition portion of the body.

In another aspect of the present disclosure, a gasket clip is provided. The gasket clip includes a head, a body, and a leg extending from an end of the main body. The body is substantially perpendicular to the head and includes a main body portion and a transition portion connecting the head to the main body. The leg overlaps with the transition portion of the body.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
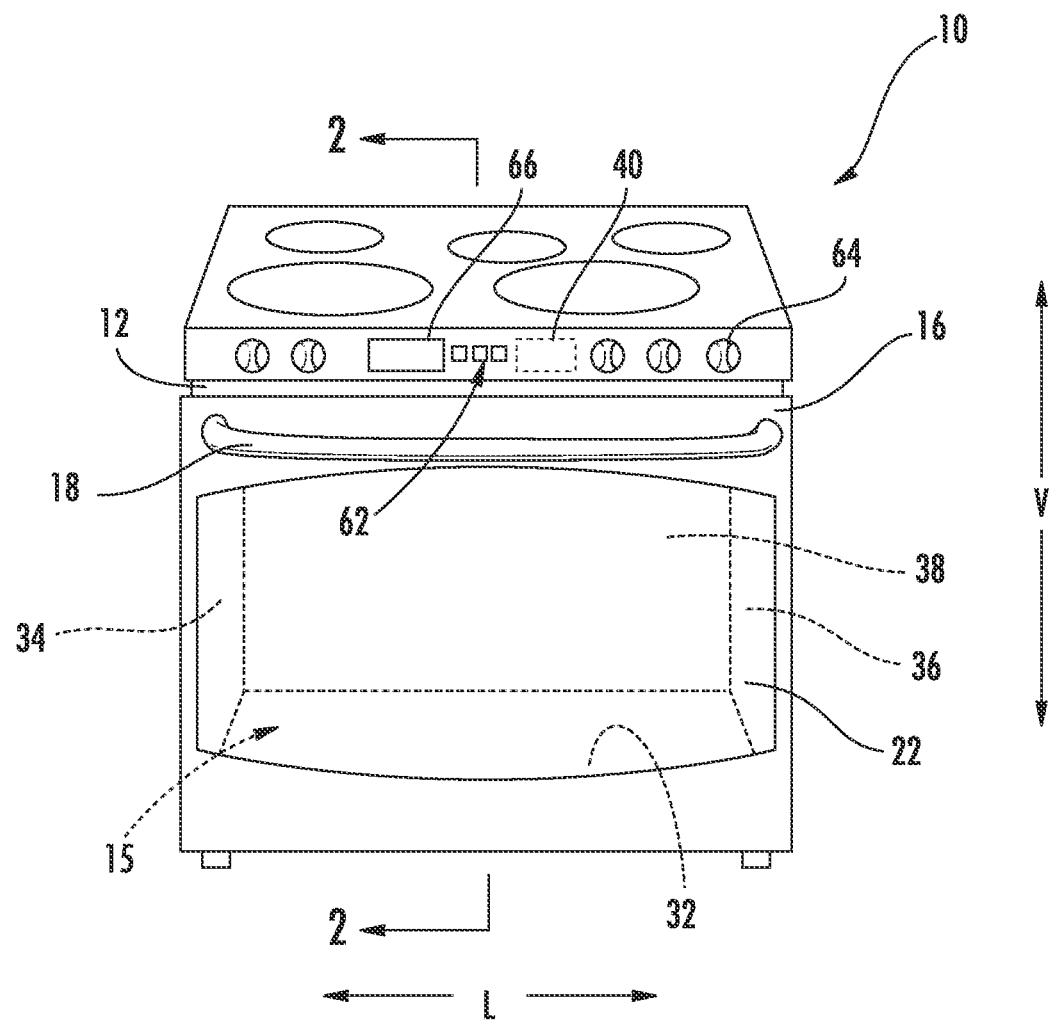
FIG. 1 provides a front perspective view of an oven appliance according to one or more example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 2:
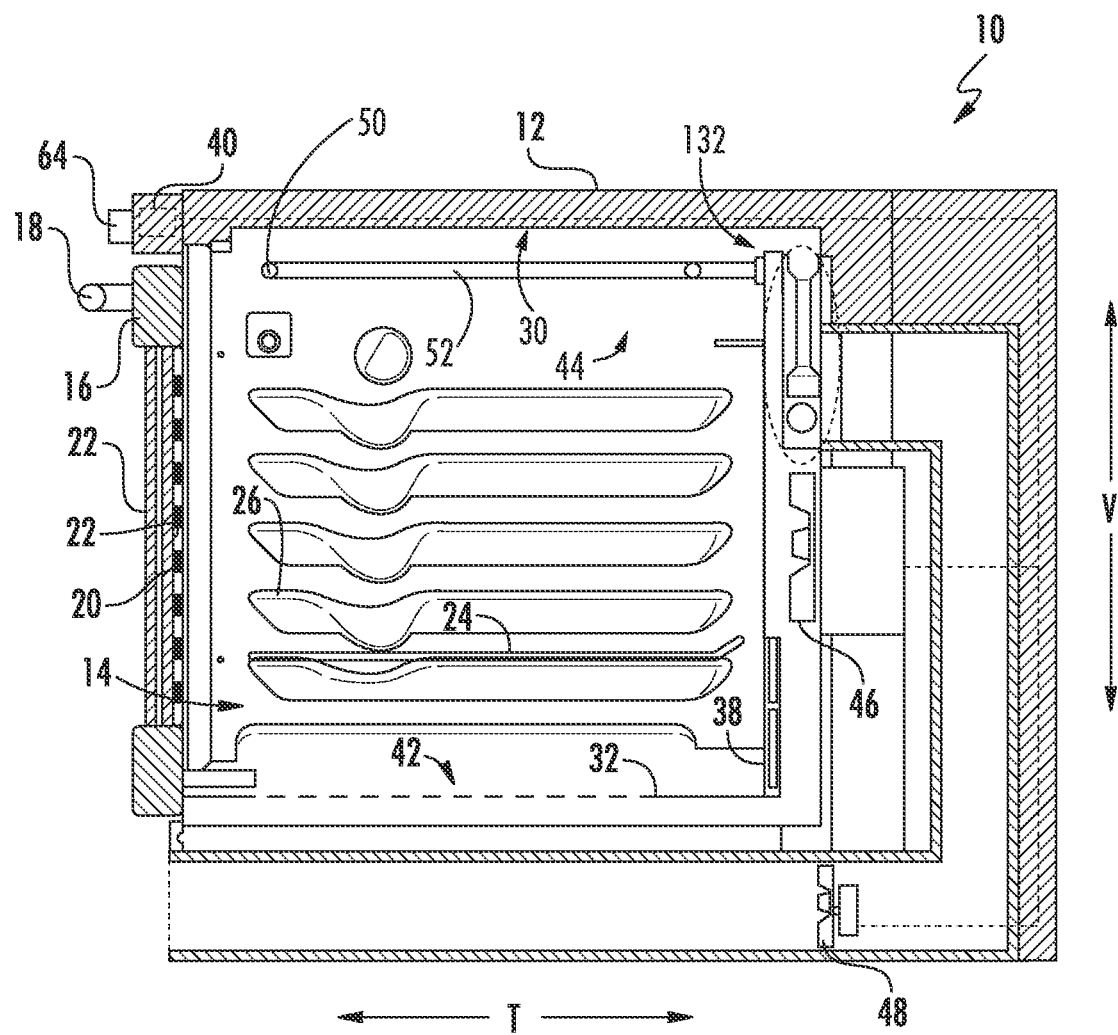
FIG. 2 provides a sectional view of the example oven appliance of FIG. 1 taken along the line 2-2 of FIG. 1.
Figure 3:
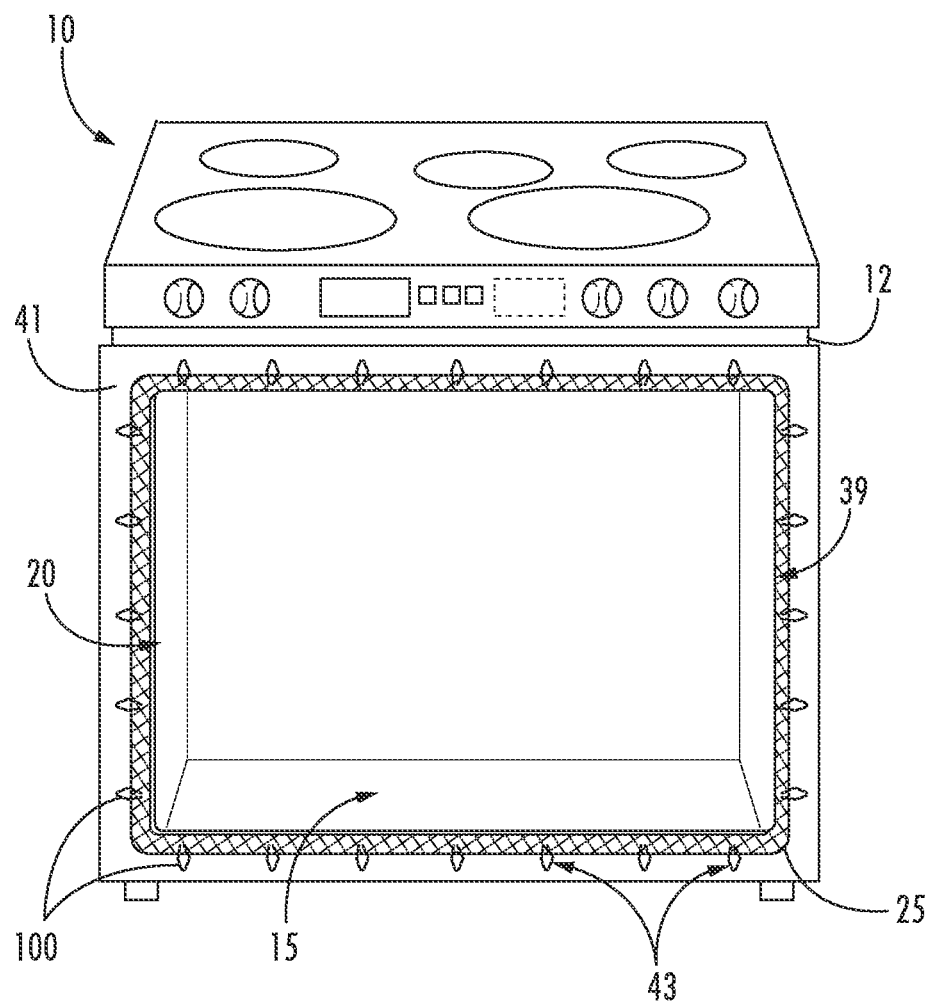
FIG. 3 provides a front perspective view of an oven appliance according to one or more example embodiments of the present disclosure with the door removed.

Turning now to the figures, FIGS. 1 through 3 provide views of an example oven appliance which may incorporate embodiments of the present subject matter. For instance, FIG. 1 provides a perspective view of an oven appliance 10 according to example embodiments of the present subject matter. FIG. 2 provides a section view of oven appliance 10 taken along the 2-2 line of FIG. 1. FIG. 3 provides a front view of oven appliance 10 with a door 16 omitted. Oven appliance 10 defines a vertical direction V, a lateral direction L, and a transverse direction T. The vertical direction V, lateral direction L, and transverse direction T are mutually perpendicular and form an orthogonal direction system. As will be understood, oven appliance 10 is provided by way of example only, and the present subject matter may be used in any suitable oven appliance. For example, the oven appliance may be a wall oven or a freestanding range that also includes a cooktop, as illustrated. As another example, the oven appliance may include multiple interior cavities that define multiple heating chambers in the oven appliance. Thus, the present subject matter may be used with other oven or range appliance configurations, e.g., that define multiple interior cavities for the receipt of food and/or having different configuration than what is shown in FIG. 2.

Oven appliance 10 includes an insulated cabinet 12 with an interior cooking chamber 14 defined by an interior surface 15 of cabinet 12. Cooking chamber 14 is configured for the receipt of one or more food items to be cooked. Oven appliance 10 includes a door 16 rotatably mounted to cabinet 12, e.g., with a hinge (not shown). A handle 18 is mounted to door 16 and assists a user with opening and closing door 16 in order to access opening 20 to cooking chamber 14. For example, a user can pull on handle 18 to open or close door 16 and access cooking chamber 14 through front opening 20.

Oven appliance 10 includes a seal or braided gasket 25 as shown in FIG. 3, between door 16 and cabinet 12 that assists with maintaining heat and cooking fumes within cooking chamber 14 when door 16 is closed as shown in FIG. 2. Multiple parallel glass panes 22 provide for viewing the contents of cooking chamber 14 when door 16 is closed and assist with insulating cooking chamber 14. A baking rack 24 is positioned in cooking chamber 14 for the receipt of food items or utensils containing food items. Baking rack 24 is slidably received onto embossed ribs 26 or sliding rails such that rack 24 may be conveniently moved into and out of cooking chamber 14 when door 16 is open.

As shown, various walls define the cooking chamber 14. For example, cooking chamber 14 includes a top wall 30 and a bottom wall 32 which are spaced apart along the vertical direction V. Left sidewall 34 and right sidewall 36 (as defined according to a perspective front view as shown in FIG. 1, e.g., from the perspective of a user facing the oven appliance 10 to access/use the oven appliance 10 and/or cooking chamber 14) extend between the top wall 30 and bottom wall 32, and are spaced apart along the lateral direction L. A rear wall 38 additionally extends between the top wall 30 and bottom wall 32 as well as between the left sidewall 34 and right sidewall 36, and is spaced apart from the door 16 along the transverse direction T. Cooking chamber 14 is thus defined between the top wall 30, bottom wall 32, left sidewall 34, right sidewall 36, and rear wall 38.

Furthermore, the top wall 30, bottom wall 32, left sidewall 34, and right sidewall 36 collectively form a perimeter 39 defining front opening 20 to cooking chamber 14. The perimeter 39 comprises a front face 41 parallel to front opening 20. Front face 41 may contain one or more gasket mounting openings 43 spaced apart from one another to allow the braided gasket 25 to be attached to the cabinet, as described below.

Optionally, a lower heating assembly 42 may be included in oven appliance 10, e.g., for baking operations within cooking chamber 14. Lower heating assembly 42 may include a discrete heating element (not pictured) which is disposed within the cooking chamber 14, such as adjacent to the bottom wall 32. In some embodiments, the lower heating assembly 42 includes a gas burner. Additional components, such as an igniter and a fuel line may be provided in some such embodiments. Alternatively, the lower heating assembly 42 may include an electric heating element or may be any other suitable bake assembly having any other suitable heating element.

An upper heating assembly, such as a broiler assembly 44, may be included in oven appliance 10. Broiler assembly 44 includes a convection heating element 50 and a radiant heating element 52. The radiant heating element 52 may be an electric heating element, such as a resistive heating rod as illustrated in FIG. 2. The convection components of broiler assembly 44 include one or more air handlers 46, 48, e.g., fans or blowers, and a convection heating element 50. As illustrated, convection heating element 50 is generally positioned away from cooking chamber 14 such that convection heat (and not radiation heat) is received in cooking chamber 14 from convection heating element 50. Convection heating element 50 may be an electric heating element, such as a resistive heating rod, or a gas burner configured to generate a heated gas for cooking operations. Air handler(s) 46, 48 may be in fluid communication with convection heating element 50 to motivate heated gas from the convection heating element 50 and through a broil outlet 132 into the cooking chamber 14. Broil outlet 132 may be provided at or proximate to a top portion of the cooking chamber 14, e.g., at the top wall 30, such as at or proximate to an intersection of the top wall 30 with the rear wall 38. Moreover, during certain operations, broil outlet 132 may be downstream from air handler(s) 46, 48 and convection heating element 50 to receive a heated gas therefrom.

Advantageously, the heating elements 50 and 52 may employ different heat sources, e.g., the convection heating element 50 may be a gas burner and the radiant heating element 52 may be an electric heating element, such that the combined system, e.g., broiler assembly 44, provides advantages over broilers using a single energy source, such as only electric or only combustion. In such embodiments, the radiant heating element 52 may be a low-power heating element. Thus, the combined broiler assembly 44 may provide improved heat intensity as compared to a purely radiant or purely convective broil system. By bathing the electric element 52 in the hot air or exhaust from the convective heating element 50, the relatively low powered (e.g., about 1500 W) electric element 52 can achieve temperatures that will allow it to radiate substantial energy to food items in the cooking chamber, and together with the convective heat element 52 gives superior broil results.

Oven appliance 10 may further include a controller 40, e.g., configured to control one or more operations of the oven appliance 10. For example, controller 40 may control at least one operation of oven appliance 10 that includes broiler assembly 44. Controller 40 may be in communication (via for example a suitable wired or wireless connection) with the heating elements 50 and 52 as well as other suitable components of the oven appliance 10, as discussed herein. In general, controller 40 may be operable to configure the oven appliance 10 (and various components thereof) for cooking. Such configuration may be based, for instance, on a plurality of cooking factors of a selected operating cycle or mode.

By way of example, controller 40 may include one or more memory devices and one or more microprocessors, such as general or special purpose microprocessors operable to execute programming instructions or micro-control code associated with an operating cycle. The memory may represent random access memory such as DRAM, or read only memory such as ROM or FLASH. In one embodiment, the processor executes programming instructions stored in memory. The memory may be a separate component from the processor or may be included onboard within the processor.

Controller 40 may be positioned in a variety of locations throughout oven appliance 10. As illustrated, controller 40 may be located within a user interface panel 62 of oven appliance 10 as shown in FIGS. 1 through 3. In some such embodiments, input/output ("I/O") signals may be routed between controller 40 and various operational components of oven appliance 10, such as convection heating element 50, radiant heating element 52, air handler(s) 46, 48, controls 64, display component 66, sensors, alarms, and/or other components as may be provided. For instance, signals may be directed along one or more wiring harnesses that may be routed through cabinet 12. In some embodiments, controller 40 is in communication with user interface panel 62 and controls 64 through which a user may select various operational features and modes and monitor progress of oven appliance 10. In one embodiment, user interface panel 62 may represent a general purpose I/O ("GPIO") device or functional block. In one embodiment, user interface panel 62 may include input components, such as one or more of a variety of electrical, mechanical or electro-mechanical input devices including rotary dials, push buttons, and touch pads. User interface panel 62 may include a display component 66, such as a digital or analog display configured to provide operational feedback to a user.

As noted previously, a seal or braided gasket 25 may be interposed between cabinet 12 and door 16 when door 16 is in the closed position, as shown in FIG. 3. In particular, braided gasket 25 may be positioned between door 16 and front face 41 of perimeter 39 when door 16 is in the closed positions. Braided gasket 25 may be held in position by one or more gasket clips 100, a portion of gasket clips 100 extended through openings in the braided gasket 25 and through gasket mounting openings 43 on the front face 41 of perimeter 39. Although FIG. 3 depicts braided gasket 25 attached to perimeter 39 of cabinet 12, one of ordinary skill in the art will recognize that braided gasket 25 may, in alternative embodiments, be mounted to an interior side of door 16. In such embodiments, the interior side of door 16 would comprise openings about a perimeter of door 16 in the substantially the same fashion as such openings are described herein in the embodiment in which the braided gasket is attached to perimeter 39 of cabinet 12.

In the preferred embodiment, gasket clip 100 may comprise a single gauge wire bent at multiple points on the gauge wire as further discussed below. However, one of ordinary skill will recognize that alternative embodiments could employ two or more gauge wires welded or otherwise connected together in a conventional manner in accordance with the principles of the invention. Regardless of the number of gauge wires that comprise gasket clip 100, gasket clip 100 is composed of several distinct sections or portions.

Figure 4A:
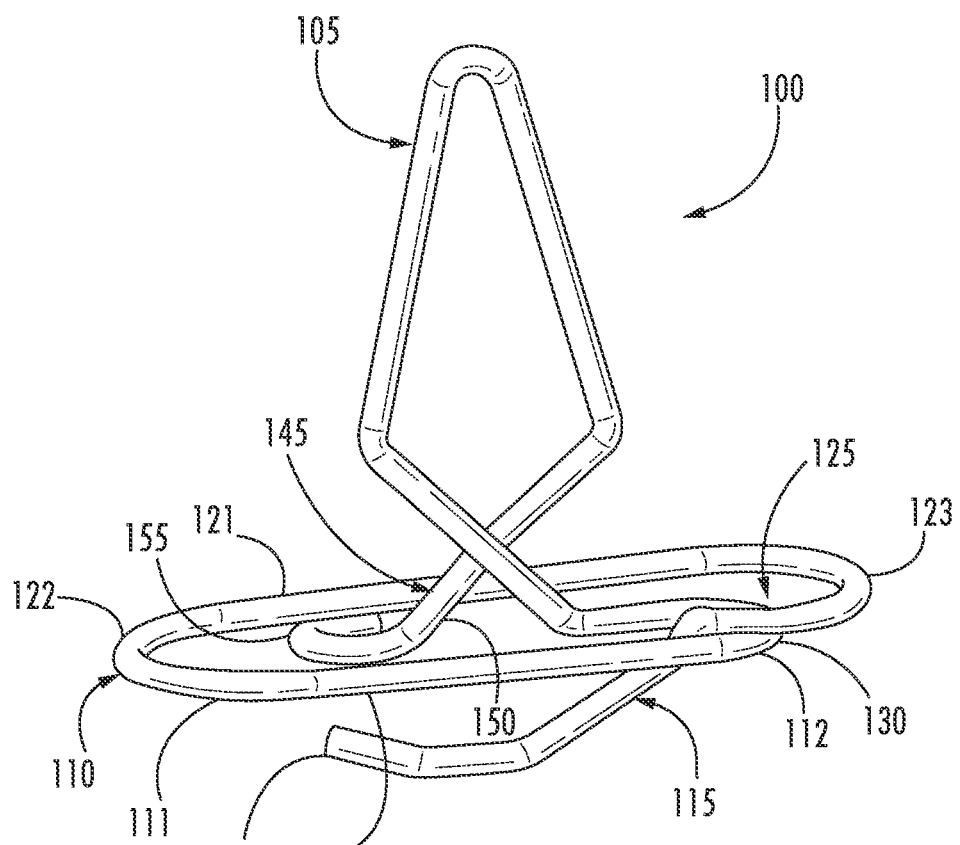
FIG. 4A provides a front perspective view of a gasket clip according to one or more example embodiments of present disclosure.
Figure 4B:
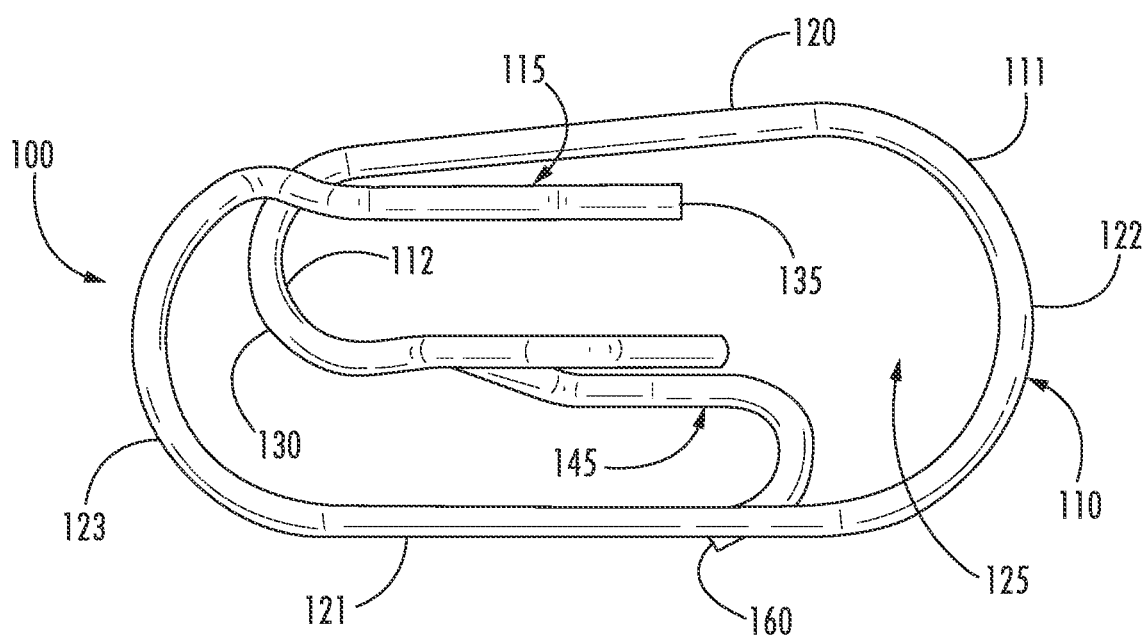
FIG. 4B provides a top view of a gasket clip according to one or more example embodiments of present disclosure.

Gasket clip 100 comprises a head 105, a body 110, and a leg 115. The head 105, as shown in FIGS. 4A to 4B, may be folded into a loop, for example, in the shape of a diamond. The shape of head 105 is narrower at its ends and wider in a section of head 105 between its ends. Head 105 is intended to be inserted into the gasket mounting openings 43 on the front face 41 of perimeter 39 and, in coordination with other elements of the gasket clip 100 described below, to anchor braided gasket 25 to cabinet 12. The shape of head 105 is such that its ends are smaller than the gasket mounting openings 43, but some portion of head 105 between its ends is wider than gasket mounting openings 43. In this way, an end of head 105 may be inserted into a gasket mounting opening 43 on the front face 41 of perimeter 39. The front face 41 provides a resistive force to head 105 as it is inserted, causing head 105 to collapse (i.e., narrowing the width of head 105) until the center of head 105 is narrower than the gasket mounting opening 43 and allowing head 105 to pass though gasket mounting opening 43. Once the widest portion of head 105 passes through gasket mounting opening 43, the resistive force is no longer present and the spring force of head 105 restores head 105 to its original shape in which the widest portion of head 105 is wider than the gasket mounting opening 43, thus preventing head 105 from exiting. A variety of wire gauges and materials may be used in order to alter the stiffness and strength of the gasket clip 100, as will be understood by a skilled artisan. In alternative embodiments, head 105 need not be diamond-shaped, but rather may take any shape consistent with the disclosure above. The description of the form and operation of head 105 above is provided in the context of attaching head 105 to cabinet 12. However, the description is equally applicable to alternative embodiments in which head 105 is inserted into openings in door 16, where braided gasket is attached to door 16, as previously explained.

The gasket clip 100 further comprises body 110. Body 110 is oriented substantially perpendicular to head 105. The orientation of body 110 is intended to maximize the surface area of body 110 in the direction of force that is to be applied to head 105. Thus, while orienting the plane in which body 110 lies perpendicular to head 105 maximizes the surface area to resist the forces on head 105, and is preferred, body 110 need not be exactly perpendicular (e.g., body 110 may be oriented at 60-120 degrees with respect to head 105).

Body 110 of gasket clip 100 may comprise a main body portion 111 and a transition portion 112. In the preferred embodiment, main body portion 111 is essentially oval in shape and, as noted above, is oriented within a plane that is substantially perpendicular to head 105. Body 110 comprises a first linear element 120, a second linear element 121 that is substantially parallel (i.e., within 35 degrees) to first linear element 120, a first semi-circular element 122 connecting first linear element 120 and second linear element 121, and a second semi-circular element 123 extending from the end of second linear element 121 in the direction of first linear element 120. Together, first linear element 120, second linear element 121, first semi-circular element 122, and second semi-circular element 123 define a body opening 125. Head 105 is situated entirely on one side of body opening 125. One of ordinary skill in the art will recognize that this precise shape is not necessary to practice the invention and other shapes would suffice. That is, main body portion 111 need not be an oval and need not comprise semi-circular ends. Rather, main body portion 111 could be completely circular, without linear elements or semi-circular ends. Alternatively, main body portion 111 could have linear elements connected by semi-rectangular ends. Ultimately, any shape that creates a surface area that prevents body 110 from being pulled through the mesh openings in braided gasket 25 would suffice.

As explained, body 110 also comprises a transition portion 112. Transition portion 112 connects head 105 to main body portion 111. In particular, transition portion 112 extends from first linear element 120 of main body portion 111 on the opposite side of first semi-circular element 122. Transition portion 112 then forms an inner semi-circular element 130 having a radius smaller than second semi-circular element 123. Transition portion 112 extends from inner semi-circular portion 130, and within body opening 125, until it meets head 105, thereby connecting body 110 to head 105. As with the main body portion 111 above, the shape of transition portion 112 is not of critical importance to the invention and other shapes may suffice to connect main body portion 111 to head 105 consistent with the disclosure herein.

At least a portion of body 110 resides within braided gasket 25. In the preferred embodiment, main body portion 111 is contained entirely within braided gasket 25. Transition portion 112 of body 110 is also contained within braided gasket 25, with the exception that the segment of transition portion 112 directly connecting body 110 to head 105 may be external to braided gasket 25. In alternative embodiments, the entirety or most of transition portion 112 may reside outside braided gasket 25.

Gasket clip 100 also comprises a leg 115 extending from an end of main body portion 111 of body 110. In the preferred embodiment, leg 115 extends from second semi-circular element 123 of main body portion 111 parallel to first linear element 120 of main body portion 111. Notably, leg 115 overlaps transition portion 112 of body 110. In one embodiment, leg 115 extends over transition portion 112 of body 110. By overlapping leg 115 and transition portion 112, any force exerted on head 105 will prevent leg 115 and body 110 from being pulled out of braided gasket 25 independent of one another, providing added strength and stability to gasket clip 100.

After overlapping with transition portion 112, leg 115 angles downward, extending below the plane in which body 110 lies (i.e., on the opposite side of body 110 from head 105). At least a portion of leg 115 then extends parallel to the plane of body 110. The leg has an end 135. In the preferred embodiment, end 135 is attached to the portion of leg 115 extending parallel to body 110 and is angled toward body 110. In this way, force applied to the leg by an installer avoids any sharp portions of the leg from causing any injury or discomfort to the installer. In alternative embodiments, end 135 need not be directly connected to the portion of leg 115 that is parallel to body 110, but in any case, end 135 is angled toward body 110. In still other embodiments, leg 115 may lack any segment parallel to body 110 (e.g., leg 115 may be rounded in a circular shape with a large radius), but end 135 of leg 115 must be angle toward body 110 in such embodiments as well.

Referring still to FIGS. 4A and 4B, gasket clip 100 may further comprise a tail 145. Tail 145 is connected to an end of head 105. A first portion 150 of tail 145 extends downward, towards body 110. Once tail 145 reaches the body opening 125, a second portion 155 of tail 145 extends substantially parallel to the plane of body 110. In the preferred embodiment, the second portion 155 of the tail 145 has a tail end 160 wherein the second portion of the tail 145 is bent in a semi-circular shape such that tail end 160 is angled toward head 105. In some embodiments, second portion 155 of tail 145 may be bent toward first linear element 120 of main body portion 111. In other embodiments, second portion 155 of tail 145 may be bent toward second linear element 121 of main body portion 111. However, it is not necessary for tail end 160 to face head 105 to fall within the scope of the invention. For example, in alternative embodiments, the second portion 155 of tail 145 may extend in any direction parallel to the plane of body 110. In addition, or alternatively, all or a portion of second portion 155 of the tail 145 may extend below at least a portion of body 110, providing an additional point of resistance to forces applied to head 105.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance comprising:
   a cabinet defining a cooking chamber to receive items to be cooked, the cooking chamber comprising a top wall, a bottom wall, a rear wall, and opposing sidewalls, the top wall, bottom wall, and sidewalls collectively forming a perimeter defining a front opening to the cooking chamber;
   a door pivotably attached to the cabinet, wherein the door pivots between an open position and a closed position and the door covers the front opening of the cooking chamber when the door is in the closed position;
   a braided gasket, wherein the braided gasket is positioned between the oven door and the front face of the perimeter when the oven door is in the closed position;
   a gasket clip for attaching the braided gasket to the oven appliance, wherein the gasket clip comprises
      a head for attaching the braided gasket to the oven appliance;
      a body at least partially contained within the braided gasket, the body being substantially perpendicular to the head and further comprising a main body portion and a transition portion connecting the head to the main body; and
      a leg extending from an end of the main body, wherein the leg overlaps with the transition portion of the body.

2. The oven appliance of claim 1, wherein at least a portion of the leg extends to the opposite side of the body from the head.

3. The oven appliance of claim 2, wherein at least a portion of the leg extends parallel to the body.

4. The oven appliance of claim 3, wherein the leg has an end attached to the portion of the leg that extends parallel to the body, the end of the leg angled toward the body.

5. The oven appliance of claim 2, wherein the leg has an end, the end of the leg angled toward the base.

6. The oven appliance of claim 1, wherein the gasket clip has a tail connected to the head, a portion of the tail extending towards the body and a second portion of the tail extending parallel to the body.

7. The oven appliance of claim 6, wherein the second portion of the tail has an end, the end of the second portion of the tail angled toward the head.

8. The oven appliance of claim 6, wherein at least a portion of the tail extends below at least a portion of the body.

9. The oven appliance of claim 1, wherein
the perimeter of the cooking chamber comprises a front face parallel to the front opening, the front face having one or more openings; and
the head of the gasket clip attaches the braided gasket to the one or more openings in the front face of the perimeter.

10. The oven appliance of claim 1, wherein
the door comprises an interior side, the interior side of the door having one or more openings; and
the head of the gasket clip attaches the braided gasket to the one or more opening on the interior side of the door.

11. A gasket clip comprising
a head;
a body being substantially perpendicular to the head and further comprising a main body portion and a transition portion connecting the head to the main body; and
a leg extending from an end of the main body, wherein the leg overlaps with the transition portion of the body.

12. The oven appliance of claim 11, wherein at least a portion of the leg extends to the opposite side of the body from the head.

13. The oven appliance of claim 12, wherein at least a portion of the leg extends parallel to the body.

14. The oven appliance of claim 13, wherein the leg has an end attached to the portion of the leg that extends parallel to the body, the end of the leg angled toward the body.

15. The oven appliance of claim 12, wherein the leg has an end, the end of the leg angled toward the base.

16. The oven appliance of claim 15, wherein the gasket clip has a tail connected to the head, a portion of the tail extending towards the body and a second portion of the tail extending parallel to the body.

17. The oven appliance of claim 16, wherein at least a portion of the tail extends below at least a portion of the body.

18. The oven appliance of claim 11, wherein the gasket clip has a tail connected to the head, a portion of the tail extending towards the body and a second portion of the tail extending parallel to the body.

19. The oven appliance of claim 18, wherein the second portion of the tail has an end, the end of the second portion of the tail angled toward the head.

20. The oven appliance of claim 18, wherein at least a portion of the tail extends below at least a portion of the body.

* * * * *